United States Patent [19]

Afsar et al.

[11] Patent Number: 5,812,812
[45] Date of Patent: Sep. 22, 1998

[54] METHOD AND SYSTEM OF IMPLEMENTING AN EARLY DATA DEPENDENCY RESOLUTION MECHANISM IN A HIGH-PERFORMANCE DATA PROCESSING SYSTEM UTILIZING OUT-OF-ORDER INSTRUCTION ISSUE

[75] Inventors: Muhammad Nural Afsar, Solana Beach, Calif.; Romesh Mangho Jessani, Austin, Tex.; Soummya Mallick, Austin, Tex.; Robert Greg McDonald, Austin, Tex.; Mukesh Sharma, Austin, Tex.

[73] Assignees: International Business Machines Corporation, Armonk, N.Y.; Motorola, Inc., Schaumburg, Ill.

[21] Appl. No.: 740,911

[22] Filed: Nov. 4, 1996

[51] Int. Cl.$^6$ ............................................. G06F 9/38
[52] U.S. Cl. ................................................. 395/392
[58] Field of Search .................. 395/382, 391, 395/376, 800.01, 392

[56] References Cited

U.S. PATENT DOCUMENTS 5,463,746  10/1995  Brodnax et al. ................. 395/376
5,655,133   8/1997  Dupree et al. ................ 395/800.23

FOREIGN PATENT DOCUMENTS

455966A2  11/1991  European Pat. Off. .

OTHER PUBLICATIONS

Gurindar, Sohi, "Instruction Issue Logic for High–Performance, Interruptible, Multiple Functional Unit, Pipelined Computer", 1900 IEEE, pp. 349–359.

*Primary Examiner*—David Y. Eng
*Attorney, Agent, or Firm*—Casimer K. Salys; Antony P. Ng; Andrew J. Dillon

[57] ABSTRACT

A method and system of implementing an early data dependency resolution mechanism for a high-performance data processing system that utilizes out-of-order instruction issue is disclosed. In accordance with the present disclosure, an instruction cache and a register-dependency cache are provided. The instruction cache has multiple cache lines, and each of these cache lines is capable of storing multiple instructions. The register-dependency cache contains an identical number of cache lines as in the instruction cache, and each of the cache lines within the register-dependency cache is capable of storing an identical number of register-dependency units as instructions in each of the cache lines within the instruction cache. In a single processor cycle, a group of register-dependency units are fetched from the register-dependency cache. All register-dependency units that have no forward data dependency within the group of register-dependency units are identified utilizing an Instruction Dispatch Unit. Each of the identified register-dependency units is then translated to its respective instruction utilizing a corresponding cache line within the instruction cache. All of the translated instructions are issued within a next processor cycle.

8 Claims, 5 Drawing Sheets

METHOD AND SYSTEM OF IMPLEMENTING AN EARLY DATA DEPENDENCY RESOLUTION MECHANISM IN A HIGH-PERFORMANCE DATA PROCESSING SYSTEM UTILIZING OUT-OF-ORDER INSTRUCTION ISSUE

BACKGROUND

1. Technical Field

The present disclosure relates to a method and system for data processing in general and, in particular, to a method and system for out-of-order instruction issue within a data processing system. Still more particularly, the present disclosure relates to a method and system of implementing an early data dependency resolution mechanism for out-of-order instruction issue within a high-performance data processing system.

2. Description of the Related Art

Typically, a sequence of instructions within a processor are fetched and issued as long as a relevant functional unit (such as an execution unit) within the processor is available. With in-order instruction issue, the processor stops decoding instructions whenever a decoded instruction creates a resource conflict or has a true data dependency or an output dependency on an uncompleted instruction. As a result, the processor is not able to proceed beyond the instruction having the conflict or data dependency, even though one or more subsequent instructions may be executed immediately. To overcome this limitation, an instruction window (or a buffer) may be added between the fetching stage and the issuing stage such that the processor can continue to fetch instructions regardless of whether or not these instructions can be issued immediately. The processor continues fetching instructions and placing those instruction into the instruction window as long as there is room in the instruction window. At the same time, the processor examines the instructions in the instruction window to locate all the instructions that can be issued immediately. An Instruction Dispatch Unit within the processor is utilized to enforce data dependencies among all the instructions within the instruction window by controlling the correct routing of data between functional units and registers. Because instructions are issued from the instruction window without regard for their original program order, this method of instruction dispatching is commonly known as out-of-order instruction issue.

Still, out-of-order instruction issue is effective only when instructions can be supplied at a rate sufficient enough to keep the relevant functional units busy. If the average rate of instruction fetching is less than the average rate of instruction execution, processor performance will be limited by instruction fetching. On the other hand, the issuance of instructions will have to stop if a relevant functional unit is needed by multiple instructions in the instruction window. Further, if any instruction operands (e.g., registers) are not available, the instruction will also have to wait in the instruction window associated with its functional unit. Thus, the instruction window that the Instruction Dispatch Unit snoops for determining the register dependencies, in its steady state, is limited by the fetch bandwidth (i.e., limited lookahead).

The fetch bandwidth limitation can be demonstrated by the following example. Consider a processor which can fetch up to two instructions per clock cycle, and which has a cache with eight words per line. Thus, for every cycle, two instructions may be fetched from the cache, decoded and issued, provided there is no conflict with uncompleted instructions. Further consider a code sequence stored in one of the cache lines of the processor, as follows:

| I0: | add  | R1, R20, R21     |
| --- | ---- | ---------------- |
| I1: | add  | R2, R1, R22      |
| I2: | stw  | R2               |
| I3: | mult | R22, R30, R31    |
| I4: | sub  | R5, R30, R31     |
| I5: | fmul | FRR2, FR22, FR23 |
| I6: | fsub | FRR3, FR24, FR25 |
| I7: | fadd | FRR4, FR26, FR27 |

As shown, I1 has a data dependency on the execution of I0 to obtain the operand R1. Also, I2 has a data dependency on the execution of I1 to obtain the operand R2. I3 cannot be executed out-of-order because the writing to target R22 could corrupt the source R22 for I1.

For an in-order issuing processor, which fetches and issues two instructions per clock cycle, I0 and I1 are fetched and decoded in one clock cycle. However, the execution of I1 is stalled due to its data dependency on I0. For an out-of-order issuing processor, the stalling of the execution of I1 does not prevent further instructions from being fetched, decoded, and issued. The Instruction Dispatch Unit can identify all leaf instructions within the instruction window for dispatching. A leaf instruction is an instruction that does not have any forward data dependency on uncompleted or stalled instructions (such as I3,I4,I5,I6 and I7 in the above code sequence). The ability to fetch, decode, and issue leaf instructions are well-known under prior art. However, because the number of instructions that can be scanned to identify leaf instructions is limited by the fetch bandwidth, the resolution and detection of leaf instruction per clock cycle is limited.

Consequently, it would be desirable to widen the fetch bandwidth by providing an early data dependency resolution mechanism for a high-performance data processing system that utilizes out-of-order processing (issue and execute).

SUMMARY

It is therefore an object of the present disclosure to provide an improved method and system for data processing;

It is another object of the present disclosure to provide an improved method and system for out-of-order instruction issue within a data processing system;

It is yet another object of the present disclosure to provide an improved method and system of implementing an early data dependency resolution mechanism for out-of-order instruction issue within a high-performance data processing system.

In accordance with the present disclosure, an instruction cache and a register-dependency cache are provided. The instruction cache has multiple cache lines, and each of these cache lines is capable of storing multiple instructions. The register-dependency cache contains an identical number of cache lines as in the instruction cache, and each of the cache lines within the register-dependency cache is capable of storing an identical number of register-dependency units as instructions in each of the cache lines within the instruction cache. In a single processor cycle, a group of register-dependency units are fetched from the register-dependency cache. All register-dependency units that have no forward data dependency within the group of register-dependency units are identified utilizing an Instruction Dispatch Unit. Each of the identified register-dependency units is then translated to its respective instruction utilizing a corresponding cache line within the instruction cache. All of the translated instructions are issued within a next processor cycle.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative disclosure when read in conjunction with the accompanying drawings, wherein.

DETAILED DESCRIPTION OF AN ILLUSTRATIVE EMBODIMENT

An illustrative embodiment under the present disclosure may be implemented on a variety of cache-based processors and/or data processing systems. For the purpose of illustration, a PowerPC™ microprocessor manufactured by International Business Machines Corporation, which operates according to reduced instruction set computing (RISC) techniques, is utilized to demonstrate an illustrative embodiment of the present disclosure.

Figure 1:
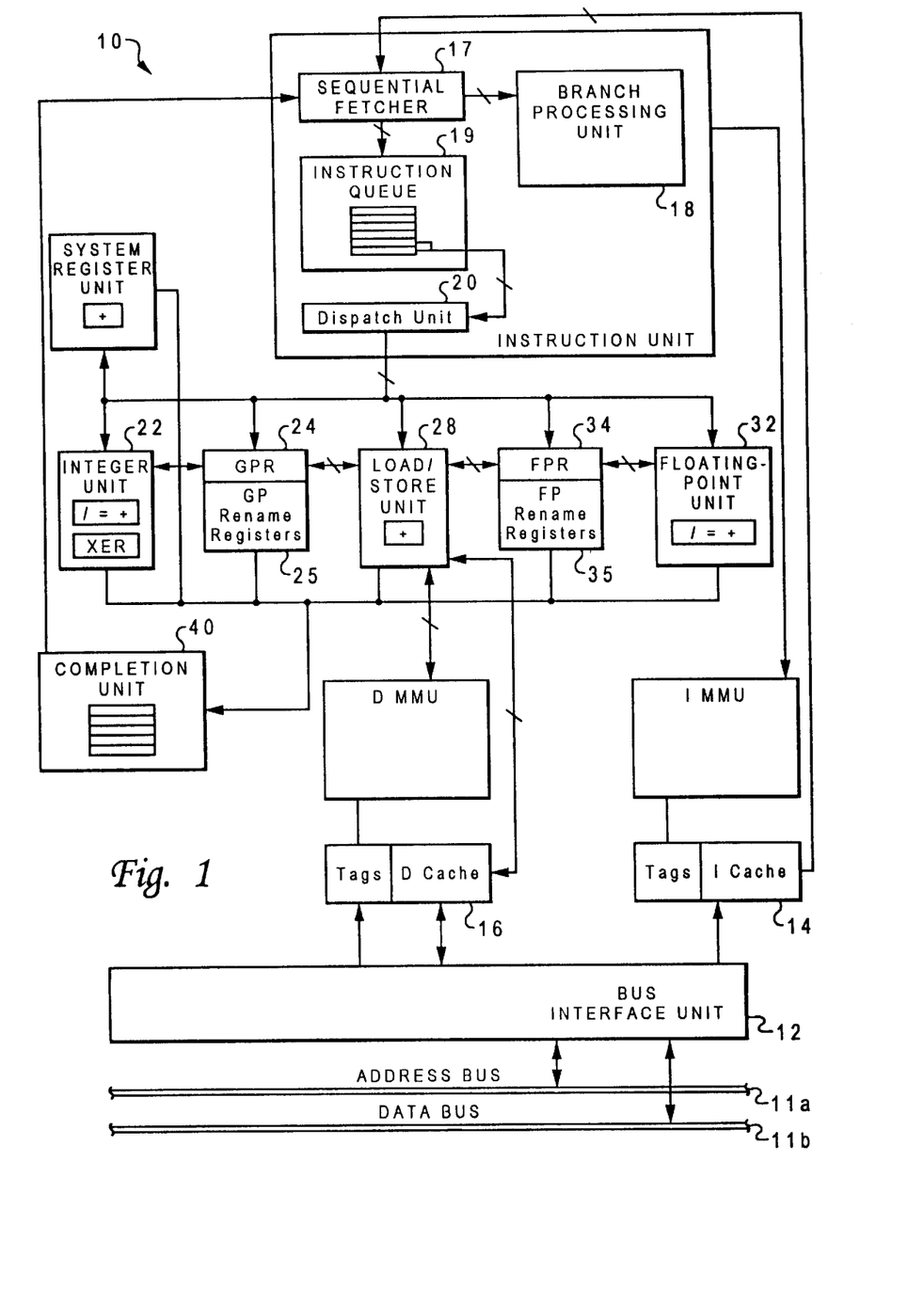
FIG. 1 is a block diagram of an illustrative embodiment of a processor which utilizes the method of the present disclosure.

Referring now to the drawings and in particular to FIG. 1, there is illustrated a block diagram of a processor 10 for data processing. In an illustrative embodiment of the present disclosure, processor 10 is a single integrated-circuit superscalar microprocessor, comprising various registers, buffers, execution units, and functional units. As depicted in FIG. 1, processor 10 is coupled to system bus 11 via a bus interface unit (BIU) 12 within processor 10. BIU 12 controls the transfer of information between processor 10 and other devices, such as a main memory (not shown), that are coupled to system bus 11. Processor 10, system bus 11, and the other devices coupled to system bus 11 together form a host data processing system.

Within processor 10, BIU 12 is connected to instruction cache 14 and data cache 16, in both of which an illustrative embodiment of the present disclosure may be incorporated. Both instruction cache 14 and data cache 16 are high-speed caches which enable processor 10 to achieve a relatively fast access time to a subset of instructions or data previously transferred from main memory to caches 14 and 16, thus improving the speed of operation of the host data processing system. Instruction cache 14 is further coupled to sequential fetcher 17 which fetches instructions from instruction cache 14 during each execution cycle. Sequential fetcher 17 transmits branch instructions fetched from instruction cache 14 to branch processing unit (BPU) 18 for execution, but temporarily stores sequential instructions within instruction queue 19 for later execution by other execution circuitry within processor 10.

In addition to BPU 18, the execution circuitry of processor 10 includes three execution units, namely fixed-point unit (FXU) 22, load/store unit (LSU) 28 and floating-point unit (FPU) 32. Each of these three execution units may execute one or more classes of instructions, and all execution units operate concurrently during each processor cycle. FXU 22 performs fixed-point mathematical operations such as addition, subtraction, ANDing, ORing, and XORing, utilizing source operands received from specified general purpose registers (GPR) 24 or GPR rename buffers 25. Conversely, FPU 32 performs floating-point operations, such as floating-point multiplication and division, on source operands received from floating-point registers (FPR) 34 or FPR rename buffers 35. As its name implies, LSU 28 executes floating-point and fixed-point instructions which either load data from either data cache 16 or main memory into selected GPRs 24 or FPRs 34 or which store data from a selected one of GPRs 24, GPR rename buffers 25, FPRs 34, or FPR rename buffers 35 to memory.

Processor 10 employs both pipelining and out-of-order execution of instructions to further improve the performance of its superscalar architecture. Accordingly, instructions can be executed by FXU 22, LSU 28, and FPU 32 in any order as long as data dependencies are observed.

Figure 2:
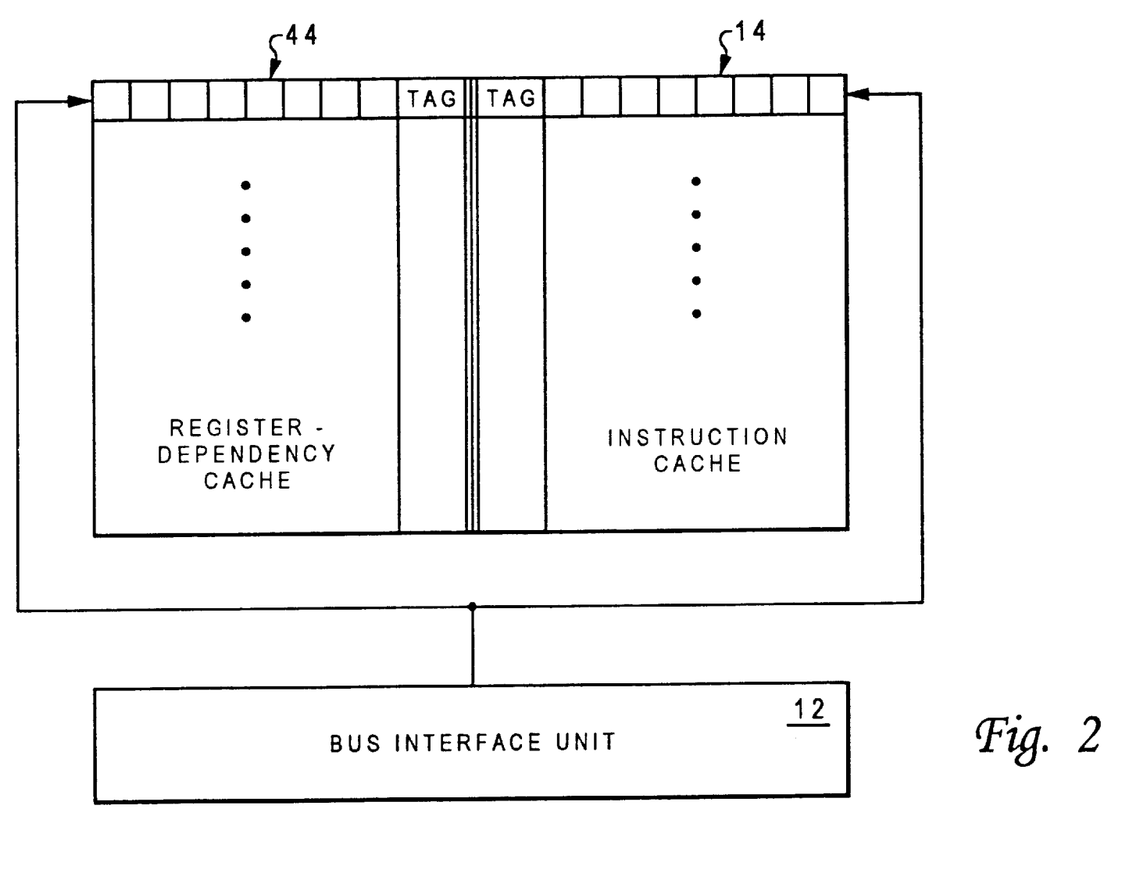
FIG. 2 is a block diagram showing the relationship between a register-dependency cache and the instruction cache of FIG. 1, in accordance with an illustrative embodiment of the disclosure.

With reference now to FIG. 2, there is shown the relationship between a register-dependency cache 44 and instruction cache 14 of FIG. 1, in accordance with an illustrative embodiment of the disclosure. The configuration of register-dependency cache 44 is mirrored after that of instruction cache 14. In addition, both register-dependency cache 44 and instruction cache 14 are coupled to BIU 12 such that when BIU 12 is indexing a cache line in instruction cache 14, a counterpart cache line in register-dependency cache 44 is also being indexed by BIU 12. Hence, any identified leaf instructions in a cache line in register-dependency cache 44 may be referenced back to a counterpart cache line in instruction cache 14 in order to obtain a complete instruction word for immediate dispatching.

Figure 3:
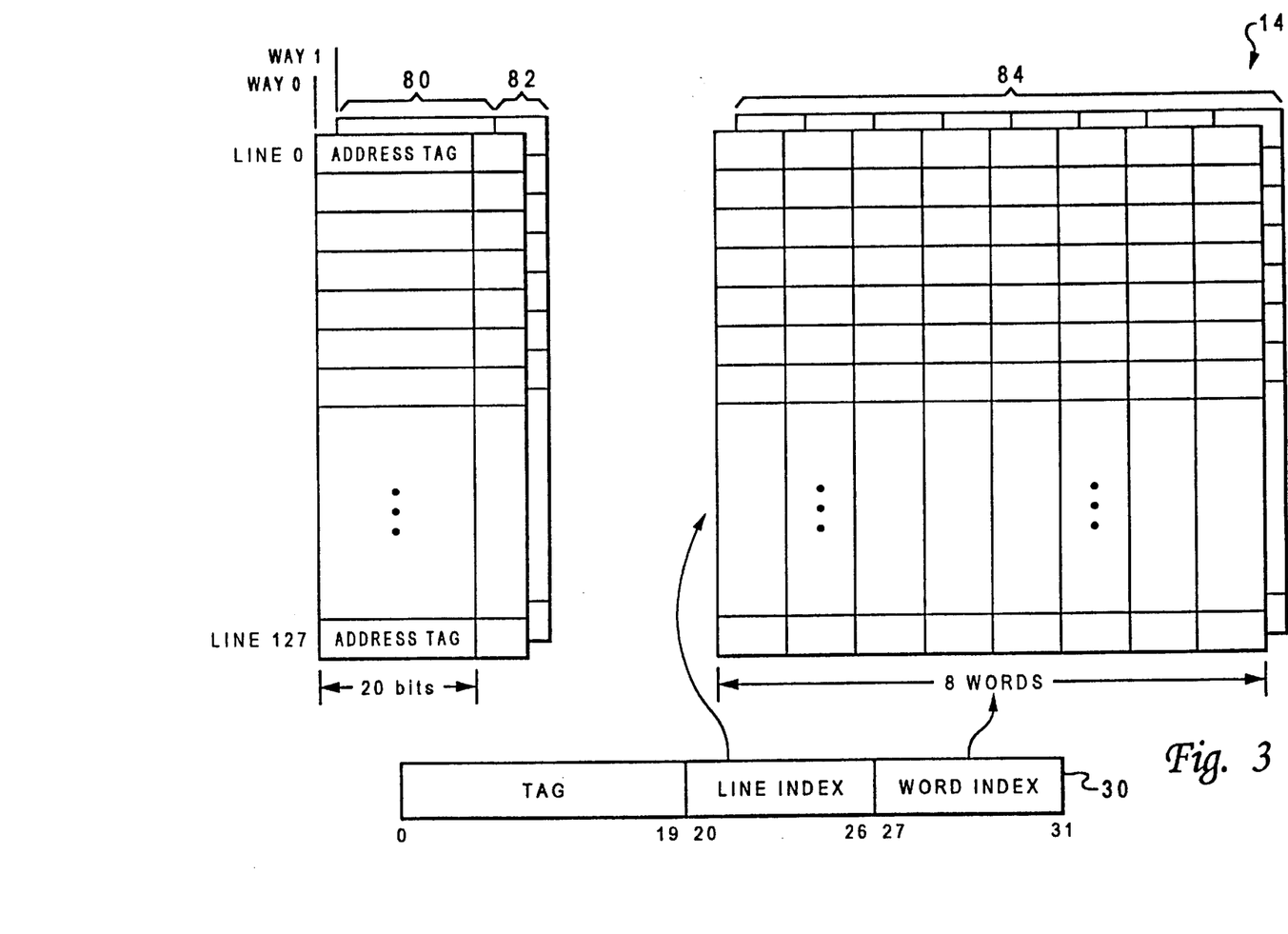
FIG. 3 is a block diagram of the organization of the instruction cache of FIG. 1 to be utilized in conjunction with a register-dependency cache.

Referring now to FIG. 3, there is depicted a block diagram of the organization of instruction cache 14 to be utilized in conjunction with a register-dependency cache 44. Instruction cache 14 may be configured as a two-way cache—way 0 and way 1, with each way having 128 cache lines, from line 0 to line 127. Each cache line comprises an address tag 80, one valid bit 82, and instruction block 84. As shown, instruction block 84 is 8 words (or 32 bytes) wide while address tag 80 is only 20 bits wide.

Each cache line may be indexed by bits 20–26 of an address 30, and each byte within the cache line may be indexed by bits 27–31 of address 30. In addition, address tag 80 within each cache line contains an address tag that is utilized for comparison with bits 0–19 of address 30 in order to determine whether there is a cache "hit" or "miss." Incidentally, a match between address tag 80 in one of ways 0 or 1 and bits 0–19 of address 30 means a cache "hit." Further, valid bit 82 is for indicating whether that particular cache line is valid or not. Conventionally, a "1" means the instruction in the cache line is valid while a "0" means the instruction in the cache line is not valid, though a reverse assignment is also acceptable.

Figure 4:
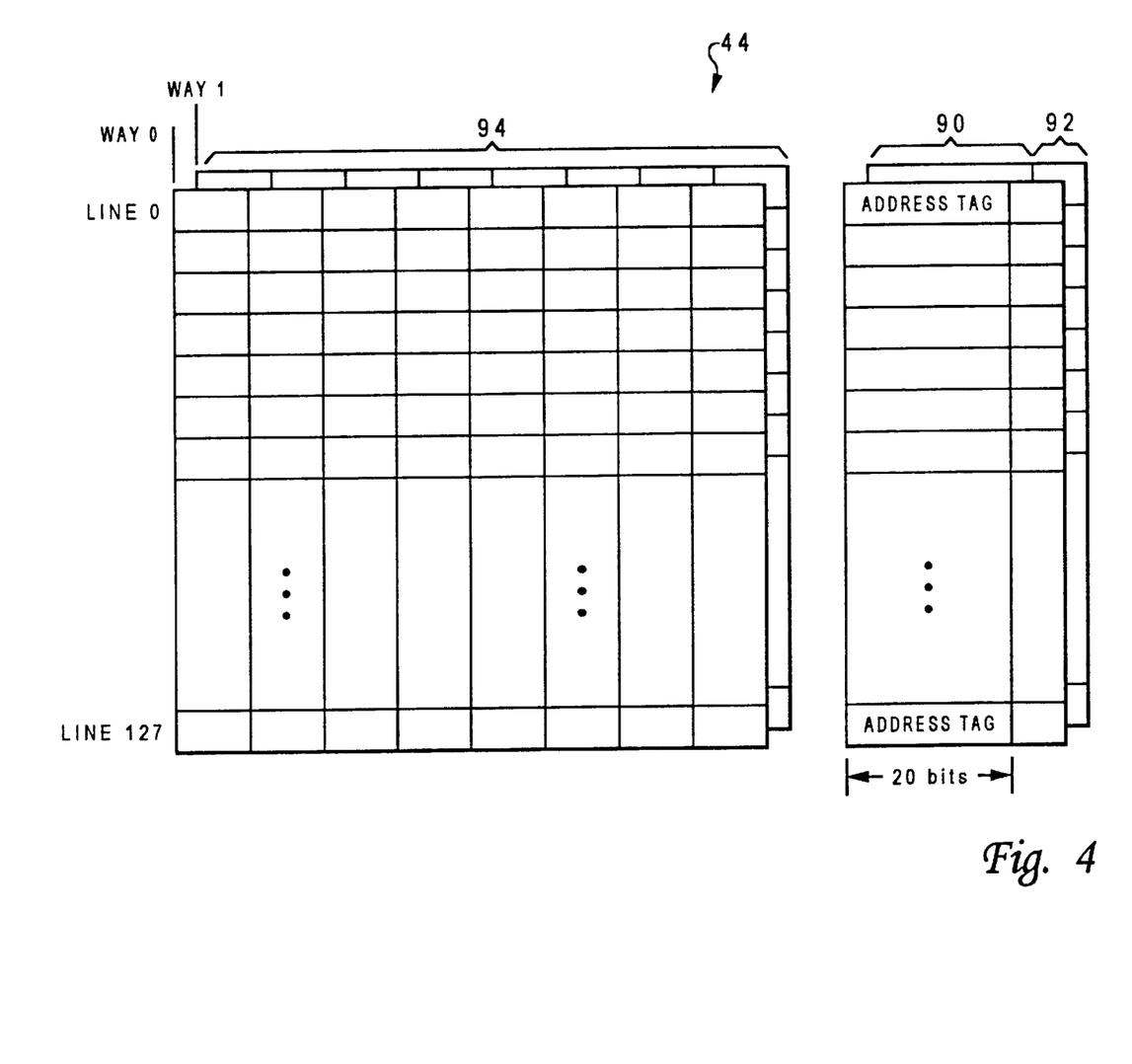
FIG. 4 is a block diagram of the organization of a register-dependency cache according to an illustrative embodiment of the disclosure.

With reference now to FIG. 4, there is depicted a block diagram of the organization of a register-dependency cache 44 according to an illustrative embodiment of the disclosure. As mentioned previously, the configuration of register-dependency cache 44 is modelled after instruction cache 14. Hence, register-dependency cache 44 is also a two-way cache-way 0 and way 1, with each way having 128 cache lines, from line 0 to line 127. Each cache line comprises an address tag 90, one valid bit 92, and register-dependency block 94. Address tag 90 and valid bit 92 are identical to address tag 80 and valid bit 82 of instruction cache 14. Register-dependency block 94 contains an identical number of register-dependency units as instruction words within instruction block 84 of instruction cache 14. For example, in FIG. 3, each cache line within instruction block 84 contains eight instruction words, thus each cache line within register-dependency block 94 also contains eight register-dependency units.

Figure 5:
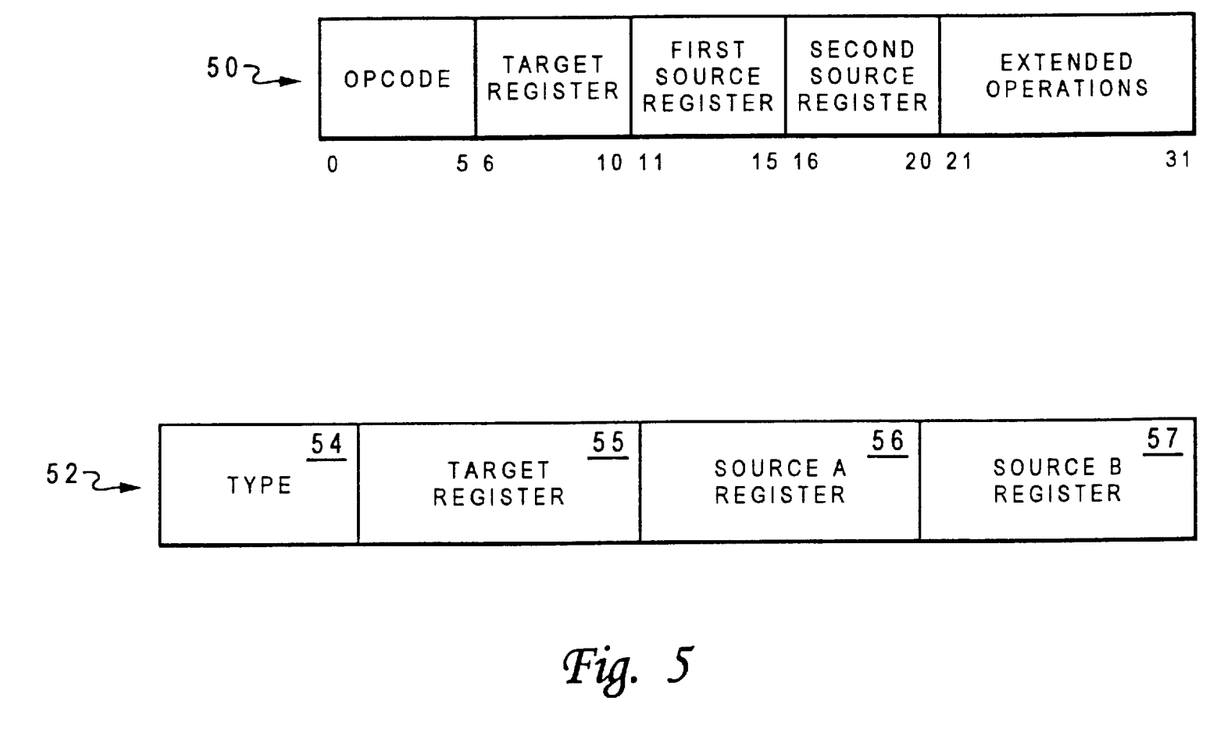
FIG. 5 is a detail illustration of a register-dependency unit within a cache line of the register-dependency block in FIG. 3.

Referring now to FIG. 5, there is a detail description of a register-dependency unit 52 within a cache line of register-dependency block 94, in accordance to an illustrative embodiment of the disclosure. Also shown in FIG. 5 is a detail description of an instruction word 50 within a cache line of instruction block 84, for comparison purpose. Under the PowerPC™ architecture, instruction word 50 is typically 32 bits long. Bits 0–5 of instruction word 50 represents an opcode, bits 6–10 indicate a target register, bits 11–15 indicate a first-source register, bits 16–20 indicate a second-source register, and bits 21–31 represent any extended operations.

As for register-dependency unit 52, under an illustrative embodiment, the maximum length is 17 bits. Type field 54, two bits long, is for encoding the type of instruction for which register-dependency unit 52 represents. One example of such encoding would be: "00" for integer loads and integer arithmetic instructions; "01" for store and compare instructions; "10" for floating-point load and floating-point arithmetic instructions; "11" for branch instructions. Target register field 55 contains the target register of instruction word 50. Source A register field 56 and source B register field 57 contain the first source register of instruction word 50 and the second source register of instruction word 50, respectively. The size of source A register field 56, source B register field 57 and target register field 55 is preferably based on the corresponding number of bits to indicate the respective registers in instruction word 50. In this case, because five bits are utilized in instruction word 50 for representing each of the above-mentioned registers, each of source A register field 52, source B register field 53, and target register field 51 is also five bits long.

As an illustrative embodiment of the present disclosure, rather than fetching instructions from a cache line within instruction cache 14, instructions are fetched from a cache line within register-dependency cache 44 instead. The total length of each register-dependency unit 52, as described above, is 17 bits long, which is approximately half of the length of an instruction word 50. Hence, by virtue of the size difference, the effective fetch bandwidth for register-dependency cache 44 is almost twice what the current technology allows for instruction cache 14. This wider effective fetch bandwidth permits a higher number of instructions to be fetched per processor cycle from register-dependency cache 44, as compared to instruction cache 14.

After the register-dependency units are fetched from the register-dependency cache 44, all the leaf instructions will then be sorted out by the Instruction Dispatch Unit. Mechanisms for figuring out leaf instructions, such as Tomasulo's algorithm or register scoreboarding, etc., are well-known in the art. Detailed discussion of such mechanisms can be found in Chapter Six, § 6.7, of *Computer Architecture: A Quantitative Approach* by John L. Hennessy & David A. Patterson. After the leaf instructions are identified, the corresponding instruction words stored in the counterpart cache line within instruction cache 14 will be dispatched for immediate execution, if the relevant functional unit is available.

As an alternative embodiment, only two bits may be utilized in register-dependency unit 52 for each of target register field 55, source A register field 56, and source B register field 57. Each of the two-bit sets represents the two most significant bits of the target register, the first source register, and the second source register of a corresponding instruction word 50. Hence, the total length of each register-dependency units 52, including type field 54, is only 8 bits long. In essence, the two most significant bits allow a set of 32 registers (originally indexed by 5 bits) to be divided into 4 quadrants. Bits "00" may represent the first quadrants, bits "01" may represent the second quadrant, bits "10" may represent the third quadrant, and bits "11" may represent the forth quadrant. Under this arrangement, a register-dependency unit having registers with the same two most significant bits are considered as the same register even though they may not be. Thus, this arrangement makes the entire register-dependency cache smaller, though, at the expense of a lower resolution for distinguishing leaf instructions.

As described, this disclosure provides a method and system of implementing an early data-dependency resolution mechanism for out-of-order instruction issue within a high-performance data processing system. This mechanism provides a wider fetch bandwidth that enables more instructions to be fetched and submitted to the pool of instructions in the instruction window in which the Instruction Dispatch Unit locates leaf instructions. Further, this mechanism also allows for certain heuristics which may be helpful for some processor architectures. For example, if a leaf instruction cannot be found, a dependent instruction which has a lower latency can be chosen for execution so that the chance of processor stalling may be lessened.

While the disclosure has been particularly shown and described with reference to an illustrative embodiment, it will be understood by those skilled in the art that various changes in form and detail may be made therein without departing from the spirit and scope of the disclosure.

What is claimed is:

1. A method of implementing an early data dependency resolution mechanism for an out-of-order instruction issue data processing system, said method comprising the steps of:

provided a plurality of cache lines within an instruction cache, wherein each of said plurality of cache lines is capable of storing a plurality of instructions;

storing a plurality of non-executable register-dependency units in each of a plurality of cache lines within a register-dependency cache, wherein each of said plurality of non-executable register-dependency units corresponds to a respective instruction within said instruction cache;

fetching a plurality of non-executable register-dependency units from said register-dependency cache in a single processor cycle;

detecting all non-executable register-dependency units in said fetched plurality of non-executable register-dependency units that have no forward data dependency within said fetched plurality of non-executable register-dependency units;

identifying each instruction associated with each of said detected non-executable register-dependency units that have no forward data dependency, within said instruction cache; and permitting all of said identified instructions to be issued within a next processor cycle.

2. The method of claim 1 wherein said detecting step further comprises a step of detecting all instructions that are forward data independent utilizing a Tomasulo algorithm.

3. The method of claim 2 wherein said identifying step further includes a step of identifying all non-executable register-dependency units that are forward data independent within said plurality of non-executable register-dependency units utilizing an Instruction Dispatch Unit.

4. The method of claim 1 wherein said method further includes a step of associating each of said plurality of cache lines within said register-dependency cache with a corresponding cache line within said instruction cache by a Bus Interface Unit.

5. A data processing system capable of out-of-order instruction issue, comprising:

an instruction cache having a plurality of cache lines, wherein each of said plurality of cache lines stores a plurality of instructions;

a register-dependency cache having a plurality of cache lines, wherein each of said plurality of cache lines stores a plurality of non-executable register-dependency units, wherein each of said plurality of non-executable register-dependency units corresponds to a respective instruction within said instruction cache;

means for fetching a plurality of non-executable register-dependency units from said register-dependency cache in a single processor cycle;

means for detecting all non-executable register-dependency units in said fetched plurality of non-executable register-dependency units that have no forward data dependency within said fetched plurality of non-executable register-dependency units;

means for identifying each instruction associated with each of said detected non-executable register-dependency units that have no forward data dependency, within said instruction cache; and means for permitting all of said identified instructions to be issued within a next processor cycle.

6. The data processing system of claim 5 wherein said detecting means further comprises a means for detecting all instructions that are forward data independent by utilizing a Tomasulo algorithm.

7. The data processing system of claim 6 wherein said identifying means further includes an Instruction Dispatch Unit for identifying all non-executable register-dependency units that are forward data independent within said plurality of non-executable register-dependency units.

8. The data processing system of claim 5 wherein said data processing system further includes a Bus Interface Unit for associating each of said plurality of cache lines within said register-dependency cache with a corresponding cache line within said instruction cache.

* * * * *

UNITED STATES PATENT AND TRADEMARK OFFICE
CERTIFICATE OF CORRECTION

PATENT NO. : 5,812,812
DATED : September 22, 1998
INVENTOR(S) : Afsar et al.

It is certified that error appears in the above-identified patent and that said Letters Patent is hereby corrected as shown below:

ON TITLE PAGE, ITEM [75]:

Under Inventors: Please change "Solana Beach" to --San Jose--, as the address for Muhammad Nural Afsar.

Signed and Sealed this

Twenty-third Day of February, 1999

*Attest:*

Q. TODD DICKINSON

*Attesting Officer*  *Acting Commissioner of Patents and Trademarks*